UNITED STATES PATENT OFFICE.

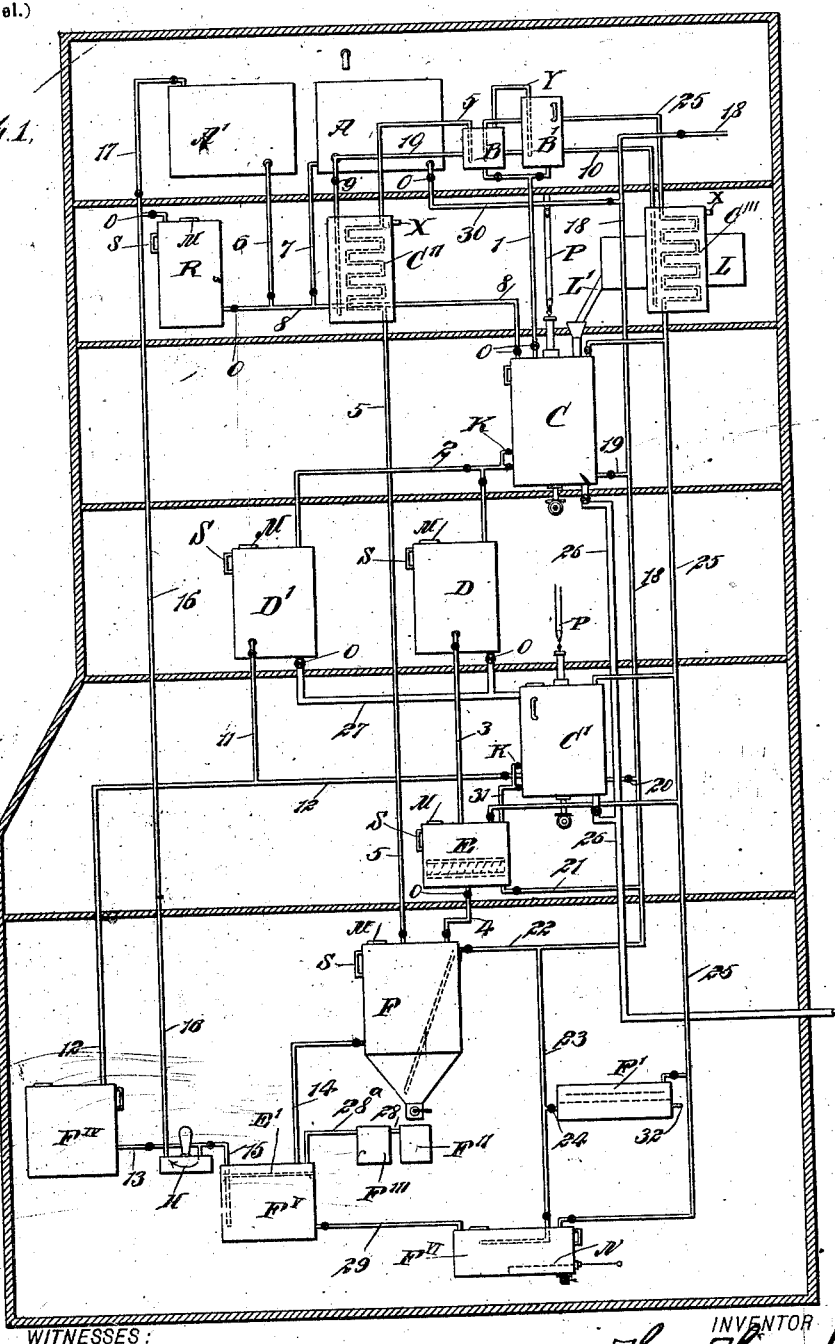

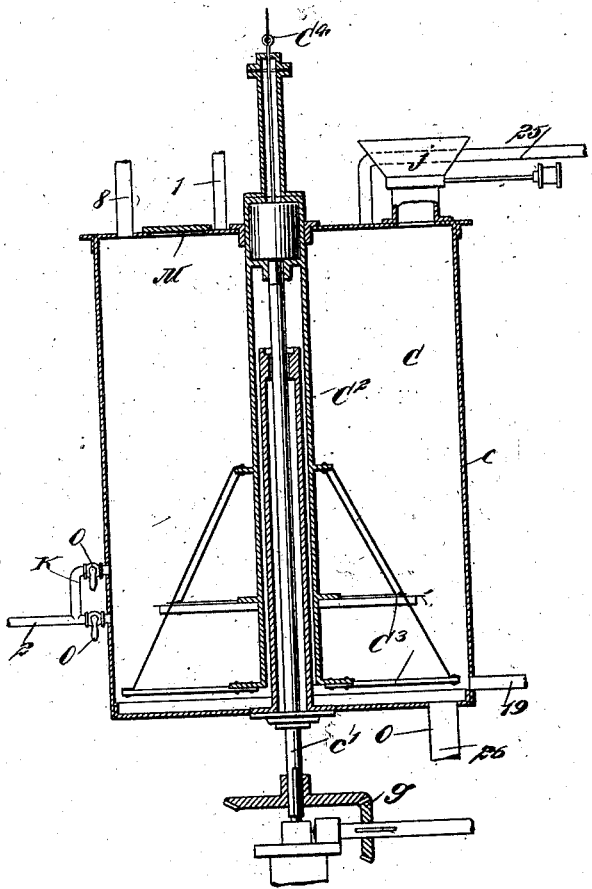

HENRY HIRSCHING, OF SALT LAKE CITY, UTAH, ASSIGNOR TO THE MINERAL UNION, LIMITED, OF PHŒNIX, ARIZONA TERRITORY.

PROCESS OF TREATING GOLD AND SILVER ORES.

SPECIFICATION forming part of Letters Patent No. 656,544, dated August 21, 1900.

Application filed May 19, 1899. Serial No. 717,478. (No specimens.)

*To all whom it may concern:*

Be it known that I, HENRY HIRSCHING, a citizen of the United States, residing in Salt Lake City, in the county of Salt Lake and State of Utah, have invented certain new and useful Improvements in the Treatment of Ores Containing Gold and Silver, of which the following is a full, clear, and exact description.

My invention relates to a process which has for its object principally the extraction of cupric oxid from copper ores; but it is also applicable for obtaining silver and gold from ores containing the same, whether with or without copper. It is an ammonia process, which is applicable to auriferous and argentiferous ores generally, but is advantageously and economically effective with refractory ores, from which copper could not be obtained satisfactorily or profitably by the melting and other processes hitherto employed. In ores containing copper in a native state or as sulfids, arsenids, carbonates, oxids, or other compounds the copper is dissolved by my solvent and readily precipitated as cupric oxid by simply heating the mixture with steam or directly by a furnace. If desired, the ores, especially those containing sulfids, arsenids, or antimonids, may be calcined or even chloridized in a furnace before lixiviation, and yet the solvent will be profitably applicable with the proper arrangements of the apparatus as compared with the old and complicated processes.

Before describing my invention in detail I will state that I am aware it is not broadly new to employ an ammonia process for the separation of the metals from the gangue with which they are found or to precipitate metals from such solutions and recover the solution or the essential part—the ammonia of the solution—again. However, my present process is superior, new in its application and final result, and strictly subjected to the chemical and physical and mechanical laws, and therefore it is a new method in hydrometallurgy. For instance, a considerable amount of ammonia was lost by one method, owing to the want of careful adjustment of the necessary amount of ammonia to the quantity of copper contained in the ore and also owing to defects of the apparatus constructed for attempting to regain the ammonia distilling the metal solution, whereby only a part of the applied ammonia is evolved, as a great many unvolitable compounds are formed during the process of extraction or the contact of the ammonia with the ore-body. If the boiled-out metal solution is wasted or discharged to the yard, as it has been done by all previous applications, the process becomes unprofitable and too expensive for practical purposes. Further, in the past the fact has been entirely overlooked that all ores, but more especially the argillaceous ores, retain a large quantity of ammonia, even after being washed thoroughly, and this loss of ammonia is highly detrimental. Said process therefore has remained practically a mere laboratory experiment.

After many years of expensive and tiresome experimenting I have succeeded in devising a practical improved ammonia process and a plant for carrying the same into effect. According to said process I obtain excellent results by using as a solvent ammonia or carbonate of ammonia separately or both mixed and with the optional addition of a nitrate; but it is advisable to add in all cases an oxidizing agent, as in this case no decomposition of the ammonia is possible, and also a higher extraction can be secured.

The amount of ammonia ($NH_3$) or compounds thereof used for dissolution of copper or copper compounds from ores is determined according to the richness of the ore. The best practical results are obtained by employing for every sixty-three parts of copper contained in the ore thirty-four parts of ammonia and in addition an excess of about one-tenth part of the applied ammonia to secure the dissolution of the available copper. If more ammonia is used, the boiling-out and condensation process is retarded for the reason that more ammonia has to be distilled than is actually necessary, and if less is employed the dissolution of the available copper is not complete.

The invention will be fully described hereinafter and the features of novelty pointed out in the appended claims.

Reference is to be had to the accompanying drawings, forming a part of this specification, in which similar characters of reference indicate corresponding parts in both views.

Figure 1 is a sectional elevation of a building containing a plant for carrying out my improved process, and Fig. 2 is a detail elevation of one of the ore-tanks with parts in section.

1. On the fifth floor is a water-tank A, boiled-out-solution tank A', safety-tank B, and condensation-tank B'. On the fourth floor is a wash-water-solution tank R, two (2) coil-tanks C'' and C''', and an ore-bin L with ore-chute L'. On the third floor is an ore-tank C. On the second floor is a settling-tank D and a wash-water-solution tank D'. On the first floor is a slime-tank C' and a filter-tank E. On the ground-floor is a cone boiler F, drying-pan F', two oxid-tanks F'' and F''', a sump-tank $F^{IV}$, a ground-tank $F^V$, a plain boiler $F^{VI}$, and also a pump H.

2. The pipe connections are as follows: Pipe 1 starts from bottom of safety and condensing tanks B and B' and leads to the top of the ore-tank C. It is provided with valves, as indicated. Pipe 2 starts from the side of the ore-tank C and leads to the settling-tank D and also to the wash-water-solution tank D'. Pipe 3 starts at the side of tank D and ends at top of filter-tank E. Pipe 4 starts from the bottom of filter-tank E and ends at top of cone-boiler F. Pipe 5 starts on top of cone-boiler F and leads through coil-tank C'' to the safety-tank B, which latter is connected by pipe $y$ with condensing-tank B'.

3. Water-supply, &c., pipes: Pipe 6 starts from boiled-out-solution tank A' and connects with pipe 8. Pipe 7 starts from water-tank A and connects with pipe 8. Pipe 8 starts from wash-water-solution tank R and ends at top of ore-tank C, thus connecting ore-tank C with tank R directly and tanks A' and A indirectly through pipes 6, 7, and 8. Pipe 9 connects water-tank A with coil-tank C''. Pipe 10 connects water-tank A with coil-tank C'''. Both of these two pipes enter the coil-tanks C'' and C''' at the top and end close to the bottom of the tank. $x$ represents overflows which are connected with ordinary piping, carrying off surplus water to the yard. Pipe 11 starts from the side of tank D' and connects with pipe 12, which starts from slime-tank C' and ends at the sump-tank $F^{IV}$. Pipe 13 forms the connection between sump-tank $F^{IV}$ and pump H. Pipe 14 starts at the side of cone-boiler F just above the cone and ends at ground-tank $F^V$, which is provided with a removable filter E' to retain floating oxids. Pipe 15 connects ground-tank $F^V$ with pump H. The piping of the pump is so arranged that by appropriately opening or closing the valves solution can be pumped from tank $F^{IV}$ or from tank $F^V$, as the case may require it, through pipe 16 to wash-water-solution tank R, or by means of a valved branch or extension of pipe 16 to pipe 17 into the boiled-out-solution tank A'.

4. Steam-supply piping: Pipe 18 starts from a suitable boiler (not shown) and connects, by means of a branch pipe 19, with ore-tank C near the bottom. Branch pipe 20 connects in the same manner with slime-tank C', branch pipe 21 with the bottom of filter-tank E, and branch pipe 22 with the top of the cone-boiler F, the pipe being extended downward near to the end of the cone. Pipe 23 is a branch from pipe 22, extending to the boiler $F^{VI}$, and has also a branch pipe 24, supplying the jacket of the drying-pan F' with steam. This pipe discharges from the water-jacket by an opening 32. In case exhaust-steam is used of course connection will be made with the exhaust-port of the engine.

5. Vapor-pipe connection besides those already mentioned, (pipe 5:) From the top of the tanks $F^{VI}$, F', E, C', and C valved branch pipes connect with the pipe 25, and this pipe enters into coil-tank C''' at the bottom, extending through the same as a coil and ending in safety-tank B, from where connection is made by pipe $y$ with condensing-tank B'. It is, however, preferable to have another set of safety and condensing tanks provided, as the pressure and absorption of the ammonia vapors can be better regulated than if only one set of tanks B and B' is employed or used. The ore is fed into ore-tank C by ore-chute L'. At the bottom of ore-tank C and slime-tank C' is the discharge-pipe 26, with a branch from slime-tank C', said pipe leading to the yard. Pipe 27 is a discharge-pipe with two branches connecting the tanks D and D' and ending at the top of tank C'. At the lowest point of the cone on the boiler F is an outlet-valve, through which the oxids may be discharged into the tank F''. An overflow-pipe 28 connects the tank F'' with tank F''', and a pipe $28^a$ connects the tank F''' with ground-tank $F^V$. Near the bottom of tank $F^V$ starts a pipe 29, which leads to the boiler $F^{VI}$. Pipe 30 starts from tank A and connects with steam-pipe 18. N is a stirrer in the boiler $F^{VI}$. Pipe 31 allows the slime-tank C' to be connected with the filter-tank E. K represents valved nipples on tanks C and C'. M represents manhole-covers, S gage-glasses, and O represents valves. As a matter of convenience water-gages are constructed on all the tanks. The ore-tank C and slime-tank C' are constructed alike, and each of them has a stationary part $c$ and a shaft $c'$, on which is adapted to slide the sleeve $C^2$, having stirrer-arms $C^3$ and provided with a ring $C^4$ for the purpose of raising the stirrer by means of any suitable hoisting device, such as rope or cable and pulleys P. The shaft $c'$ is rotated by suitable gearing $g$, and the ore-tank has on top a manhole M, with a cover and ore-feeder $j$ and two valved connections for passing stock solution at 1 and carrying off the vapors at 8, respectively. Just above the bottom of the ore-tank I place two valved nipples K to be connected in succession by the pipe 2 with the top of the settler D or wash-settler D'. Each settler has about twelve inches above the bottom the discharge-pipe 11 or 3, respectively. At the bottom of the ore-tank is an outlet connected with the pipe 26 for discharging the tailings to the yard. Near the bottom is an orifice for the injection of steam through the pipe 19 from the boiler or water from water-tank A on the top floor. Water can be charged also from top, as the case may require. After crushing the ore into a pulp to a size corresponding about to that obtained by the use of a twenty-mesh screen I proceed as follows, in four stages:

I. First stage: I first feed the required amount of the stock solution hereinbefore mentioned through the pipe 1 from the safety and condensation tanks B and B' into the ore-tank C. Then I gradually feed the fine ore through the ore-feeder $j$, agitate until a thorough disintegration has taken place, (usually two hours,) and then add sufficient water or boiled-out solution from a previous run to obtain a strong solution with a concentration of up to six pounds of copper to one cubic foot, continue to agitate about two hours, allow to settle, and discharge through one of the valves at K and pipe 2 into the settler D. The main portion of the copper is then recovered in the settler D, where plenty of time (about seven hours) is given to deposit the slime which passes into the settler with the solution. The ore in the tank has settled very closely together, and it is therefore very difficult to start an agitator remaining constantly at the same level; but by raising the agitator during the time given for settling and adding about the same amount of boiled-out solution, water, or wash-water solution as has been absorbed by the ore or slime body through the orifice near the bottom of the ore or slime tank, or adding such solution through the top valves from the respective tanks A, A', or R, a considerable pressure is created, the heavy settled ore or slime body is loosened by the downward screw-like motion of the agitator, and thus the tailings or slimes can be easily set in rotation and motion. A clutch-pulley is attached to the driving-gear to enable the agitator to be started gradually. After agitating a short time the greater part of the copper is now in solution on top of the settled ore-body, which is also passed to the settler beneath in the same manner as described before. Now, repeating the operation, I fill the ore-tank with water or boiled-out solution of a previous run, agitate again, allow to settle, and discharge into the wash-settler D' through the pipe 2, where plenty of time for settling (about six hours) is given. All the available copper is thus washed out, and if the ore-body does not require steaming to recover the retained ammonia the tailings may be discharged from the opening at the bottom of the ore-tank C into the yard by pipe 26; but if steaming is required I first pass some water into the tank, start the agitator, and pass steam from the steam-supply pipe 18 and through the same orifice where previously water was passed into the tank. The valve in the branch of vapor-pipe 25, which leads to the top of the ore-tank C, is opened, thus connecting the tank with the coil in the coil-tank C''' and passing the vapors into the safety and condensation tanks B and B'. In a very short time all the vapors are driven from the tailings, to be cooled in the coils of the coil-tank C''' and finally absorbed by the water in the condenser B'. The ammonia solution thus obtained is used again in the next operation for dissolving metals. The tailings are then discharged into the yard. I have discovered that a solution of copper in ammonia, on account of its low specific gravity, collects much easier than other solutions on top of the ore-body, and therefore one washing is usually sufficient to recover all the available copper. I have also discovered that the tailings undergo a rapid oxidation in the yard, and if it is desired to recover the copper still contained in the tailings they can be transferred back into an ore-tank to be treated again as aforesaid. With such a repetition no roasting or chloridizing even of refractory ores is required. Ores treated according to my hereinbefore-described process can then be leached with a cyanid solution to recover the precious metals, as all the metals having a disturbing action on the cyanid compounds are removed or rendered innocuous; also, the precious metals on account of the previous treatment will dissolve much more rapidly and a much more concentrated cyanid solution can be employed than according to the ordinary cyanid method. The solution obtained by such leaching is preferably treated by electrolysis for the recovery of the precious metals, as the concentrated state of such a solution reduces resistance. In fact, it is a good conductor of electricity, and can therefore be electrolyzed at a very small cost. Of course after the discharge of the tailings the ore-tanks are ready to receive a new charge of stock solution and ore, and the operation is repeated as aforesaid. It is easy to make three charges in twenty-four hours, and this is a very important factor, as such a rapid lixiviation is not possible by any other method known to me.

II. Second operation: The settler D containing the strong liquid is now emptied through the pipe 3, and as a precaution this solution is passed to the pipe 4 and boiler F through the filter-tank E in order to obtain an absolutely-clear solution in the boiler. The filter consists of coarse quartz sand at the bottom, and on top of it finer quartz sand to be covered with a sheet-iron screen, and might be covered also with a burlap or blanket to insure the retention of all particles of slime in the filter. A manhole on the filter-tank allows of the removal of the filter, and by having at or near the bottom a steam-pipe connection (21) rapid filtration can be effected in case of clogging by simply passing steam into the filter-tank for a few minutes. The strong clear copper solution in the boiler F is now boiled with steam supplied from pipes 18 and 22, the ammonia vapors passing through the pipe 5 on top of the boiler, through the coil of the coil-tank C'', and from there to the safety and condensation tanks B and B', which latter are previously supplied with a sufficient amount of common water to produce a high-grade stock solution, which is used again in the following operations. The vapors coming from the boiler F or other apparatus, as described, are cooled in the coil-tanks C'' and C''', by passing cold water through pipes 9 and 10 to nearly to the bottom of the tanks, and the warm water is discharged by overflow-pipes $x$ to the yard or may be used for feeding the steam-boilers. In hot climates an ice-machine may be employed for the cooling process.

III. Third operation: The clear solution of the wash-settler D' is discharged through a pipe 12 into the sump F$^{IV}$ on the ground-floor, and from here it is pumped up to the tank R to be used for diluting the stock solution in the ore-tank during the next operation. It will be noticed that at the bottom of the settler D and the wash-settler D' slime is settled with some solution, and all of this is now discharged through a large bottom opening and pipe 27 into a revolving cylinder or into the slime-tank C', provided with an agitator, as described. The slime will rapidly settle, and the strong clear solution is passed from the slime-tank C' by means of the pipe 31 into the filter-tank E and from here into the boiler F by pipe 4. The slime-tank C' is now filled with water, the agitator is rotated, arrested for a time, and the solution emptied into the sump-tank F$^{IV}$ by pipe 12 to be pumped up to the tank R. The next wash-water is almost white and is discharged into the ground-tanks beneath to be pumped into the boiled-out-solution tank A. Finally, I discharge the slimes to the yard, using water from the coil-tank or water-supply tank. It will be obvious that instead of raising and rotating the agitator, while leaving the tank (C or C') stationary, I may employ the reverse arrangement.

IV. Fourth operation: The boiler F contains the strong clear solution from the various tanks above, which is boiled with steam supplied through the pipes 22, extending down nearly to the bottom of the conical base of the boiler. Steam should be turned on slowly and later on stronger until the liquor is white, as may be seen at the water-gage. After allowing to settle about one hour the white boiled-out solution should be discharged through the pipe 14 into the ground-tank F$^V$. A removable filter-sieve with burlap (of the same type as shown in the filter-tank E) is used on top of these tanks to retain any floating oxids which might pass through the valves. The clear solution is pumped up through pipe 16 to the boiled-out-solution tank A to be used directly for washing the tailings in the ore-tanks at the second operation. The cone of the boiler contains some boiled-out solution and the oxids, which are discharged through a large opening at the bottom into the small ground-tank F''' nearest the drying-cylinder. The overflow passes through a filter-sieve in the tank F'''' and finally by pipe 28$^a$ to the big ground-tank F$^V$ to be used like the other boiled-out solution described above. The oxids in the first tank F''' are pressed out by any well-known or suitable means, such as a perforated sheet-iron with flat iron braces and a cover of burlap fitted into the tank, pressure being exerted by a handle and a screw-spindle resting upon bearings on the floor, or there may be located in the tank another tank, which can be lifted up against the perforations by means of chains, hooks, and pulleys, the oxids being thus pressed out and lifted out to be dried in the adjoining drying-pan F', heated by exhaust or live steam. The pan has a removable but tightly-fitting cover, and in case ammonia vapors should be contained in the oxids they can be recovered by the vapor-pipe 25, as aforesaid. The steam-jacket beneath is heated by exhaust or live steam. All of the tanks should have water-gages and they should be so arranged to allow vapors or gases from the tanks in case they are filled to pass through a small rubber pipe into hydrochloric acid or water contained in a demijohn. In the last case the produced ammonia-water will be led to the condenser to be used again with the ammonia-water already contained in such condenser, and if hydrochloric acid is used ammonia is recovered in the boiler F$^{VI}$. After using the boiled-out solution repeatedly non-volatile ammonia compounds will accumulate, from which ammonia can be recovered by adding lime-milk to the solution and heating it, thus recovering all ammonia employed.

Having thus described my invention, I claim as new and desire to secure by Letters Patent—

1. The process of treating copper ores, which consists in adding the comminuted ore gradually under agitation to an ammoniated solution, and then adding a diluting liquid to the mixture to obtain a highly-concentrated copper solution, substantially as described.

2. The process for treating copper ores, which consists in adding the comminuted ore gradually under agitation to an ammoniated solution, diluting the solution, separating it from the slimes, and washing or leaching the slimes separately.

3. The process for treating copper ores, which consists in adding the comminuted ore gradually under agitation to an ammoniated solution, diluting the solution, separating it from the slimes, washing or leaching the slimes separately, and subjecting the residue of the slimes to the action of steam to extract the ammonia therefrom.

4. The process for treating copper ores, which consists in adding the comminuted ore gradually under agitation to an ammoniated solution, diluting the solution, separating it from the slimes, washing or leaching the slimes separately, and heating the residue of the slimes to recover the ammonia therefrom.

HENRY HIRSCHING.

Witnesses:
GUSTAV SCHULZ,
W. B. FAIRFIELD.